United States Patent
Mou et al.

(10) Patent No.: US 12,433,975 B2
(45) Date of Patent: Oct. 7, 2025

(54) BREAST MILK COLLECTING METHOD BY STIMULATING MAMMARY GLAND OF BREASTFEEDER TO EJECT BREAST MILK

(71) Applicant: MICROJET TECHNOLOGY CO., LTD., Hsinchu (TW)

(72) Inventors: Hao-Jan Mou, Hsinchu (TW); Yung-Lung Han, Hsinchu (TW); Chi-Feng Huang, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 427 days.

(21) Appl. No.: 17/577,440

(22) Filed: Jan. 18, 2022

(65) Prior Publication Data
US 2023/0211056 A1    Jul. 6, 2023

(30) Foreign Application Priority Data
Jan. 4, 2022 (TW) .................................. 111100206

(51) Int. Cl.
*A61M 1/06* (2006.01)

(52) U.S. Cl.
CPC ............ *A61M 1/069* (2021.05); *A61M 1/066* (2014.02); *A61M 2205/07* (2013.01); *A61M 2205/581* (2013.01); *A61M 2205/582* (2013.01); *A61M 2205/583* (2013.01)

(58) Field of Classification Search
CPC .................. A61M 1/0697; A61M 1/06935
See application file for complete search history.

(56) References Cited

U.S. PATENT DOCUMENTS

| | | | |
|---|---|---|---|
| 9,480,783 B2 | 11/2016 | Johnson et al. | |
| 2006/0270973 A1* | 11/2006 | Chu | A61M 1/067 604/74 |
| 2010/0094078 A1* | 4/2010 | Weston | A61M 1/0693 604/74 |
| 2016/0058928 A1 | 3/2016 | Nowroozi et al. | |
| 2017/0112983 A1* | 4/2017 | Thorne | A61M 1/067 |

(Continued)

FOREIGN PATENT DOCUMENTS

| | | |
|---|---|---|
| CN | 110662482 A | 1/2020 |
| CN | 111001054 A | 4/2020 |

(Continued)

*Primary Examiner* — Courtney B Fredrickson
(74) *Attorney, Agent, or Firm* — Birch, Stewart, Kolasch & Birch, LLP

(57) ABSTRACT

A breast milk collecting method by stimulating the mammary gland of a breastfeeder to eject breast milk includes providing an audio-playing device to generate an auditory stimulation, providing a video-playing device to generate a visual stimulation, and providing a breast pump to generate a tactile stimulation and collect the breast milk. In this method, the breast pump is placed on a breast of the breastfeeder, and one or more deformable members of the breast bump is inflated or deflated alternately to touch and press the breast so as to mimic a breastfeeding condition to generate the tactile stimulation, so that the pituitary gland of the breastfeeder can be directly stimulated by the multiple sensory stimulations to secret prolatine or oxytocin, thereby allowing the mammary gland of the breastfeeder to eject the breast milk to be collected by the breast pump and treated collectively.

16 Claims, 10 Drawing Sheets

(56) References Cited

U.S. PATENT DOCUMENTS

| | | | |
|---|---|---|---|
| 2017/0136160 A1* | 5/2017 | Barral | A61M 1/0693 |
| 2018/0361040 A1* | 12/2018 | O'Toole | A61M 1/0697 |
| 2021/0060220 A1 | 3/2021 | Chang et al. | |
| 2021/0069391 A1* | 3/2021 | Quackenbush | A61M 1/064 |
| 2021/0205513 A1 | 7/2021 | O'Toole et al. | |

FOREIGN PATENT DOCUMENTS

| | | |
|---|---|---|
| CN | 111315422 A | 6/2020 |
| JP | 2001511025 A | 8/2001 |
| JP | 2020523179 A | 8/2020 |
| JP | 2021524769 A | 9/2021 |
| TW | 200618826 A | 6/2006 |

\* cited by examiner

Providing an audio-playing device to generate an auditory stimulation, so that the pituitary gland of the breastfeeder is stimulated directly by the auditory stimulation to secret prolatine or oxytocin, thereby allowing the mammary gland of the breastfeeder to eject the breast milk ~S1A Providing a breast pump to generate a tactile stimulation and collect the breast milk, wherein the breast pump is placed on a breast of the breastfeeder, and at least one deformable member of the breast bump is inflated or deflated alternately to touch and press the breast so as to mimic a breastfeeding condition to generate the tactile stimulation, so that the pituitary gland of the breastfeeder is stimulated directly by the tactile stimulation to secret prolatine or oxytocin, thereby allowing the mammary gland of the breastfeeder to eject the breast milk to be collected by the breast pump and treated collectively ~S1B

FIG. 8A

Providing a video-playing device to generate a visual stimulation, so that the pituitary gland of the breastfeeder can be directly stimulated by the visual stimulation to secret prolatine or oxytocin, thereby allowing the mammary gland of the breastfeeder to eject the breast milk ~S2A Providing a breast pump to generate a tactile stimulation and collect the breast milk, wherein the breast pump is placed on a breast of the breastfeeder, and at least one deformable member of the breast bump is inflated or deflated alternately to touch and press the breast so as to mimic a breastfeeding condition to generate the tactile stimulation, so that the pituitary gland of the breastfeeder is stimulated directly by the tactile stimulation to secret prolatine or oxytocin, thereby allowing the mammary gland of the breastfeeder to eject the breast milk to be collected by the breast pump and treated collectively ~S2B

FIG. 8B

BREAST MILK COLLECTING METHOD BY STIMULATING MAMMARY GLAND OF BREASTFEEDER TO EJECT BREAST MILK

CROSS-REFERENCE TO RELATED APPLICATION

This non-provisional application claims priority under 35 U.S.C. § 119(a) to patent application Ser. No. 11100206 in Taiwan, R.O.C. on Jan. 4, 2022, the entire contents of which are hereby incorporated by reference.

BACKGROUND

Technical Field

The present disclosure relates to a breast milk collecting method, in particular, to a breast milk collecting method by stimulating the mammary gland of a breastfeeder to eject breast milk.

Related Art

Breastfeeding plays an important role in infant survival, growth, and development. Because breast milk contains basic nutrition of neonatal brain development (particularly the colostrum contains antibodies, which can enhance the infant's resistance to diseases and reduce allergic symptoms), most mothers who are breastfeeding babies appreciate the benefits of breast milk. Therefore, in order to collect the breast milk for their babies, most mothers usually take the advantage of a manual-operated or electric breast pump to collect the breast milk.

In addition, as the breastfeeder uses the breast pump to collect the breast milk, the negative pressure continuously generated to suction the breast during the operation of the breast pump can merely suction the breast milk currently secreted by the breast. As a result, there might be no further breast milk can be suctioned from the breast after the breast pump performs the breast milk suctioning operation to the breast of the breastfeeder for a while, and cause the breastfeeder conducting breast-feeding will feel pain and uncomfortable at her breast as the breast pump continuously suctions her breast. Therefore, how to address the problem of insufficient collection of the breast milk and to ease the uncomfortable occurred in breast milk collection are important issues in this invention.

The problem to be solved in the present disclosure is how to stimulate the mammary gland of the breastfeeder to improve the breast milk collection operation. Hence, the present disclosure provides a breast milk collecting method by multiple sensory stimulations of the breastfeeder to increase breast milk secretion, wherein the pituitary gland of the breastfeeder are continuously stimulated to secret the prolatine or oxytocin and induce the secretion of the breast milk. Therefore, breast milk collection as well as multiple sensory stimulations of the breastfeeder can be achieved by the breast pump of the present invention, thus allowing breast milk collecting method provided here to be optimized.

SUMMARY

One object of the present disclosure is to provide a breast milk collecting method by stimulating the mammary gland of a breastfeeder to eject breast milk, wherein an audio-playing device is provided to generate an auditory stimulation and/or a video-playing device is provided to generate a visual stimulation, and a breast pump is provided to generate a tactile stimulation, so that the pituitary gland of the breastfeeder is stimulated by receiving the stimulations so as to secret prolatine or oxytocin and induce the "lactation phenomenon". Furthermore, the breast milk can be collected by the breast pump, thus allowing the breast milk collecting method provided here to be optimized.

To achieve the object mentioned above, in one embodiment of the present disclosure, a breast milk collecting method by stimulating the mammary gland of a breastfeeder to eject breast milk is provided and includes providing an audio-playing device to generate an auditory stimulation, so that the pituitary gland of the breastfeeder can be directly stimulated by the auditory stimulation to secret prolatine or oxytocin, thereby allowing the mammary gland of the breastfeeder to eject the breast milk; and providing a breast pump to generate a tactile stimulation and collect the breast milk, wherein the breast pump is placed on a breast of the breastfeeder, and at least one deformable member of the breast bump is inflated or deflated alternately to touch and press the breast so as to mimic a breastfeeding condition to generate the tactile stimulation, so that the pituitary gland of the breastfeeder can be directly stimulated by the tactile stimulation to secret prolatine or oxytocin, thereby allowing the mammary gland of the breastfeeder to eject the breast milk to be collected by the breast pump and treated collectively.

To achieve the object mentioned above, in another embodiment of the present disclosure, a breast milk collecting method by stimulating the mammary gland of a breastfeeder to eject breast milk is provided and includes providing a video-playing device to generate a visual stimulation, so that the pituitary gland of the breastfeeder can be directly stimulated by the visual stimulation to secret prolatine or oxytocin, thereby allowing the mammary gland of the breastfeeder to eject the breast milk; and providing a breast pump to generate a tactile stimulation and collect the breast milk, wherein the breast pump is placed on a breast of the breastfeeder, and at least one deformable member of the breast bump is inflated or deflated alternately to touch and press the breast so as to mimic a breastfeeding condition to generate the tactile stimulation, so that the pituitary gland of the breastfeeder can be directly stimulated by the tactile stimulation to secret prolatine or oxytocin, thereby allowing the mammary gland of the breastfeeder to eject the breast milk to be collected by the breast pump and treated collectively.

BRIEF DESCRIPTION OF THE DRAWINGS

The disclosure will become more fully understood from the detailed description given herein below, for illustration only and thus not limitative of the disclosure, wherein:

FIG. 8A illustrates a flowchart of the breast milk collecting method according to an exemplary embodiment of the present disclosure; and FIG. 8B illustrates a flowchart of the breast milk collecting method according to another exemplary embodiment of the present disclosure.

DETAILED DESCRIPTION

Figure 1:
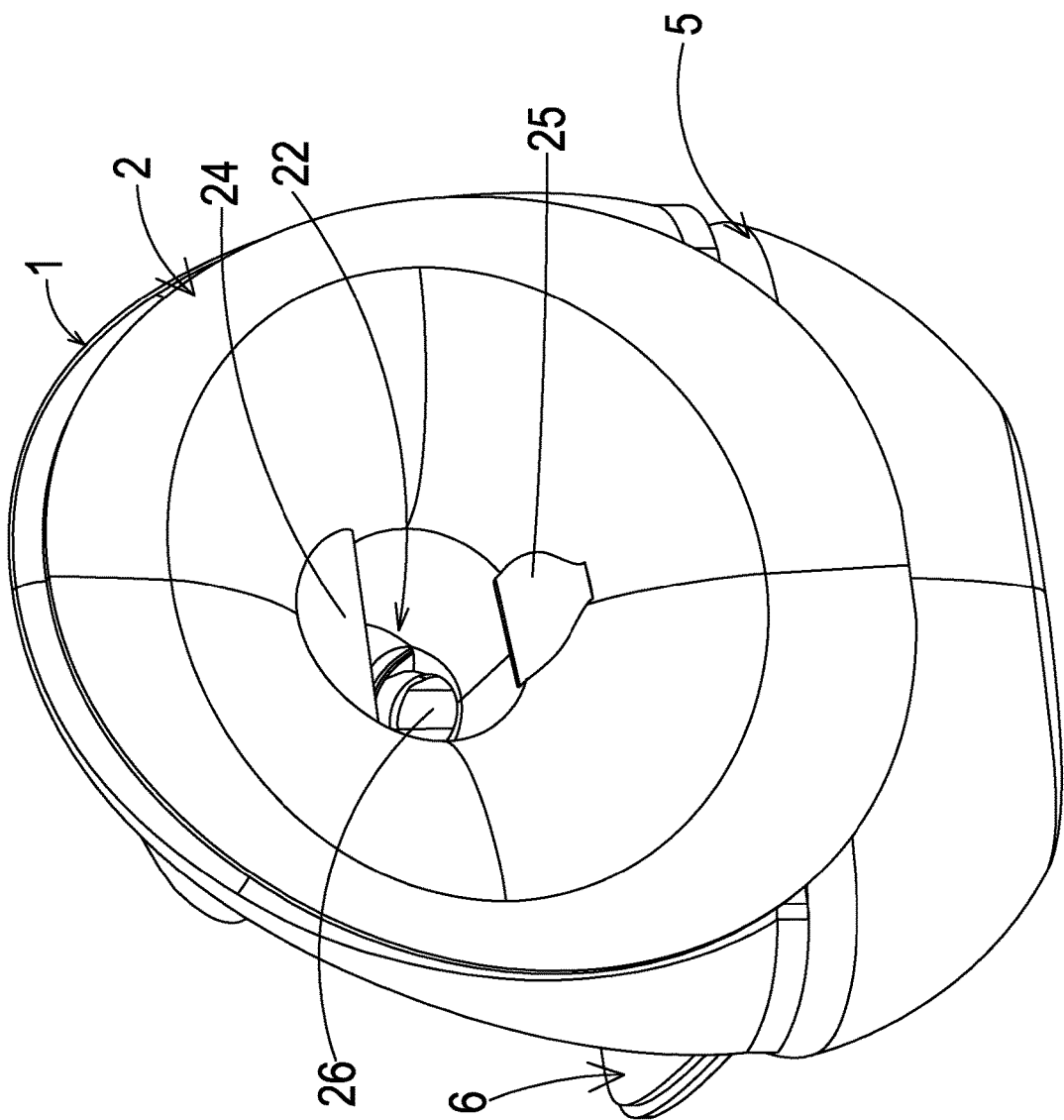
FIG. 1 illustrates a schematic perspective view of a breast pump of a breast milk collecting method by stimulating the mammary gland of a breastfeeder to eject breast milk according to an exemplary embodiment of the present disclosure.

The present disclosure will now be described more specifically with reference to the following embodiments. It is to be noted that the following descriptions of different embodiments of this disclosure are presented herein for purpose of illustration and description only, and it is not intended to limit the scope of the present disclosure.

An embodiment of the present disclosure is to provide a breast milk collecting method by stimulating the mammary gland of a breastfeeder to eject breast milk, wherein an audio-playing device is provided to generate an auditory stimulation and/or a video-playing device is provided to generate a visual stimulation, and a breast pump is provided to generate a tactile stimulation, so that the pituitary gland of the breastfeeder can be stimulated by the stimulations so as to secret prolatine or oxytocin and induce the "lactation phenomenon". Furthermore, the breast milk can be collected by the breast pump, thus allowing the breast milk collecting method provided here to be optimized.

Please refer to FIG. 8A. FIG. 8A illustrates a flowchart of the breast milk collecting method according to an exemplary embodiment of the present disclosure.

In the step S1A, an audio-playing device is provided to generate an auditory stimulation, so that the pituitary gland of the breastfeeder can be directly stimulated by the auditory stimulation to secret prolatine or oxytocin, thereby allowing the mammary gland of the breastfeeder to eject the breast milk.

In the step S2A, a breast pump is provided to generate a tactile stimulation and collect the breast milk, wherein the breast pump is placed on a breast of the breastfeeder, and at least one deformable member of the breast bump is inflated or deflated alternately to touch and press the breast so as to mimic a breastfeeding condition and generate the tactile stimulation, so that the pituitary gland of the breastfeeder can be directly stimulated by the tactile stimulation to secret prolatine or oxytocin, thereby allowing the mammary gland of the breastfeeder to eject the breast milk to be collected by the breast pump and treated collectively.

It is understood that, in one embodiment, the audio-playing device is adapted to record and/or play an infant sound (e.g., the sounds of crying, laughing, or sucking of an infant) as the auditory stimulation. Therefore, the pituitary gland of the breastfeeder can be directly stimulated by the auditory stimulation to secret prolatine or oxytocin, thereby allowing the mammary gland of the breastfeeder to eject the breast milk. Moreover, the audio-playing device may be, but not limited to, a mobile phone, a recorder, or a portable player; it should be noted that any device having the function of audio-playing can be the audio-playing device of this embodiment. Furthermore, the audio-playing device may be integrated with the breast pump, but not limited thereto.

Please refer to FIG. 8B. FIG. 8B illustrates a flowchart of the breast milk collecting method according to another exemplary embodiment of the present disclosure.

In the step S1B, a video-playing device is provided to generate a visual stimulation, so that the pituitary gland of the breastfeeder can be directly stimulated by the visual stimulation to secret prolatine or oxytocin, thereby allowing the mammary gland of the breastfeeder to eject the breast milk.

In the step S2B, a breast pump is provided to generate a tactile stimulation and collect the breast milk, wherein the breast pump is placed on a breast of the breastfeeder, and at least one deformable member of the breast bump is inflated or deflated alternately to touch and press the breast so as to mimic a breastfeeding condition to generate the tactile stimulation, so that the pituitary gland of the breastfeeder directly can be stimulated by the tactile stimulation to secret prolatine or oxytocin, thereby allowing the mammary gland of the breastfeeder to eject the breast milk to be collected by the breast pump and treated collectively.

It is understood that, in one embodiment, the video-playing device is adapted to provide an infant image and an infant sound as the visual stimulation. Therefore, the pituitary gland of the breastfeeder directly receives the visual stimulation to secret prolatine or oxytocin, thereby allowing the mammary gland of the breastfeeder to eject the breast milk. Moreover, the video-playing device may be, but not limited to, a mobile phone, a video-playing casting device, an extended reality video-playing device (a virtual reality (VR) device, an augmented reality (AR) device, a mixed reality (MR) device, a VR glasses, etc.), a television, a notebook computer, or a tablet computer; it should be noted that any device having the function of audio-playing and image displaying can be the video-playing device of the embodiment. Furthermore, the video-playing device may be miniaturized and integrated with the breast pump, but not limited thereto.

As mentioned above, in the breast milk collecting method according to one or some embodiments of the present disclosure, the infant sound is played and/or the infant image or video is displayed, and the breast pump is placed on a breast of the breastfeeder to collect the breast milk. Moreover, the breast pump includes at least one deformable member to be inflated or deflated alternately to press and touch the breast to mimic a breastfeeding condition to generate the tactile stimulation. Therefore, during the breast milk collecting procedure, the deformable member of the breast pump is provided to be inflated or deflated alternately to press and touch the breast, and the audio-playing device is provided to play an infant sound and/or the video-playing device is provided to play the image of the infant of the breastfeeder. Hence, multiple sensory stimulation of the breastfeeder can be achieved by continuously stimulating the pituitary gland of the breastfeeder to secret the prolatine or oxytocin so as to induce the "lactation phenomenon" to increase the secretion of the breast milk. Therefore, breast milk collection as well as multiple sensory stimulations of the breastfeeder can be achieved by the breast pump of one or some embodiments of the present invention, thus allowing breast milk collecting method provided here to be optimized.

In the following paragraphs, how the main body of the breast pump is assembled with the at least one deformable member to achieve the alternate inflation or deflation of the at least one deformable member to press and touch the breast so as to provide the tactile stimulation, as well as the structures of the breast pump of the first and second embodiments of the present invention are described.

Please refer to FIG. 1, FIG. 2A, FIG. 2B, FIG. 3A, FIG. 3B, FIG. 4, FIG. 5, and FIG. 6. A breast pump according to one or some embodiments of the present disclosure is provided and includes a main body 1, a breast milk suctioning shield 2, at least one air pump, a duckbill valve 4, a breast milk container 5, a connector component 6, and a flexible separation film 7.

Figure 5:
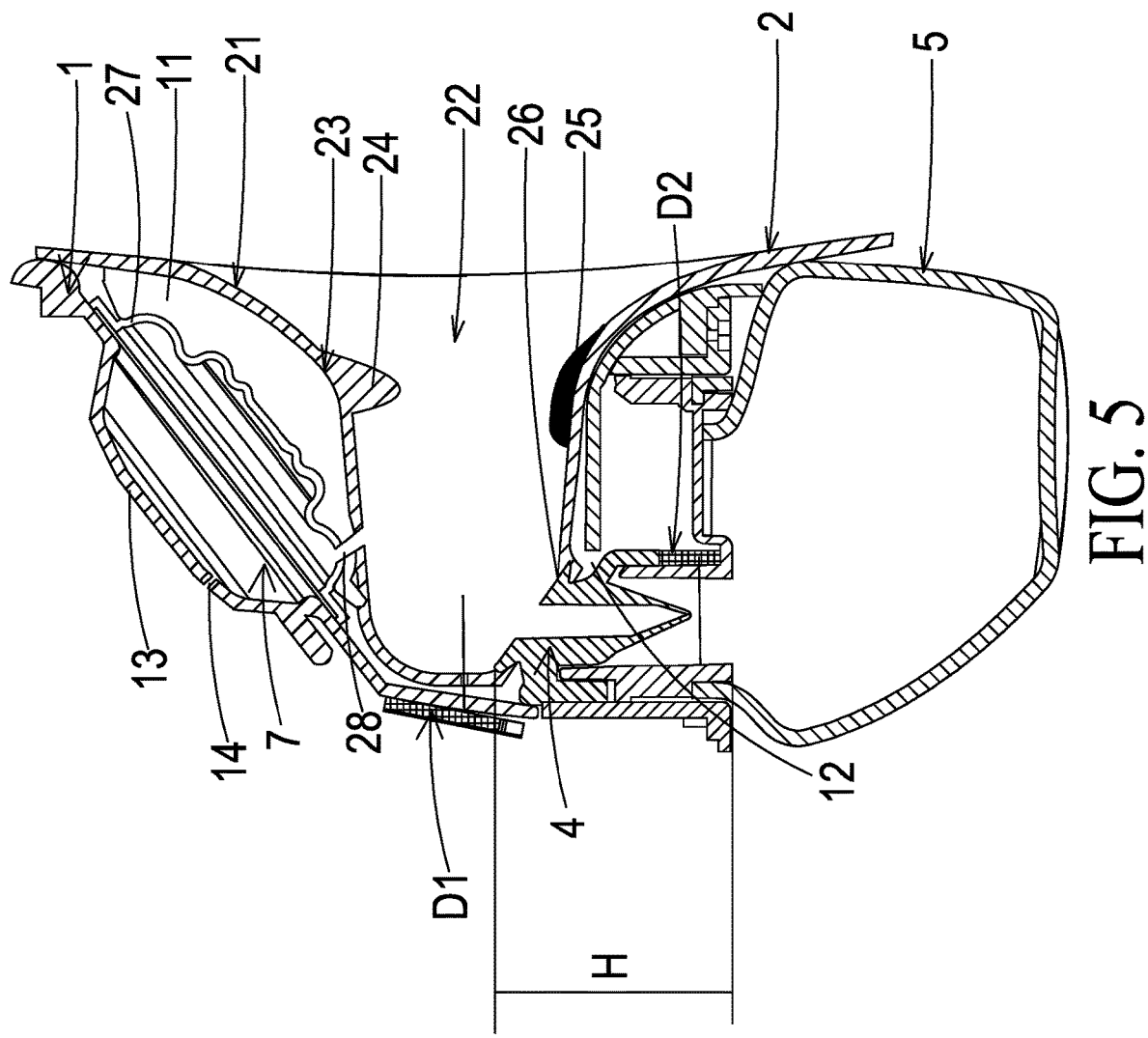
FIG. 5 illustrates a cross-sectional view of the breast pump of the breast milk collecting method of the exemplary embodiment of the present disclosure.
Figure 6:
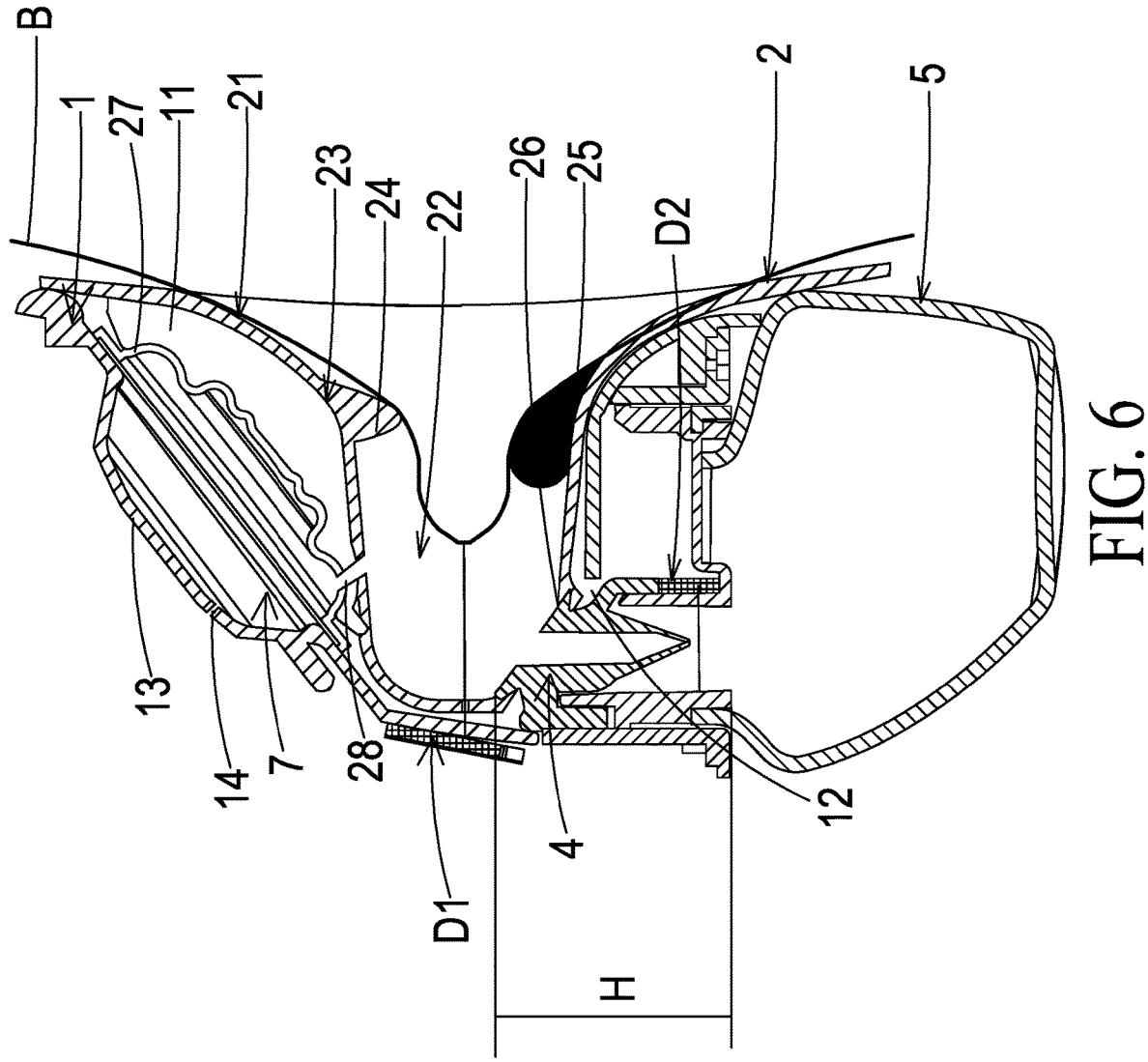
FIG. 6 illustrates a cross-sectional view showing the breast milk suctioning operation of the breast pump of the breast milk collecting method of the exemplary embodiment of the present disclosure.

The main body 1 has an accommodation space 11. The breast milk suctioning shield 2 is assembled in the accommodation space 11, and the breast milk suctioning shield 2 is detachably connected to the main body 1. A front end of the breast milk suctioning shield 2 has a breast shielding portion 21, and a nipple passage 22 extends from a rear end of a center portion of the breast shielding portion 21. At least one deformable member 25 is assembled with an annular connection portion 23 between the breast shielding portion 21 and the nipple passage 22 (as shown in FIG. 5 and FIG. 6), and the deformable member 25 is controlled by an air pump to be inflated and deflated. In the breast pump of a first embodiment of the present disclosure, the air pump may be the first air pump 3A to control the deformable member 25 to be inflated and deflated. Alternatively, in the breast pump of a second embodiment of the present disclosure, the air pump may be the second air pump 3B to control the deformable member 25 to be inflated and deflated. In one embodiment, the breast milk suctioning shield 2 is transparent and is made of a rigid material or a semi-rigid material. In one embodiment, the breast shield portion 21 is made of a flexible material and is adapted to be closely attached to the breast of the user, but not limited thereto. In one embodiment, the deformable member 25 is made of a flexible material thus is capable of being inflated and expanded or deflated and contracted. Alternatively, in one embodiment, the deformable member 25 may be made of silicone rubber or thermoplastic polyurethane (TPU). In one embodiment, the deformable member 25 is an air bag and is capable of being inflated and expanded or deflated and contracted, but not limited thereto.

Moreover, in one embodiment, the breast milk suctioning shield 2 further includes a non-deformable supporting member 24 placed at a location corresponding to the deformable member 25 in the annular connection portion 23. The number of the deformable member 25 and the non-deformable supporting member 24 can be adjusted according to actual requirements. The non-deformable supporting member 24 is made of a semi-rigid material and may be a flange structure, but not limited thereto.

Figure 4:
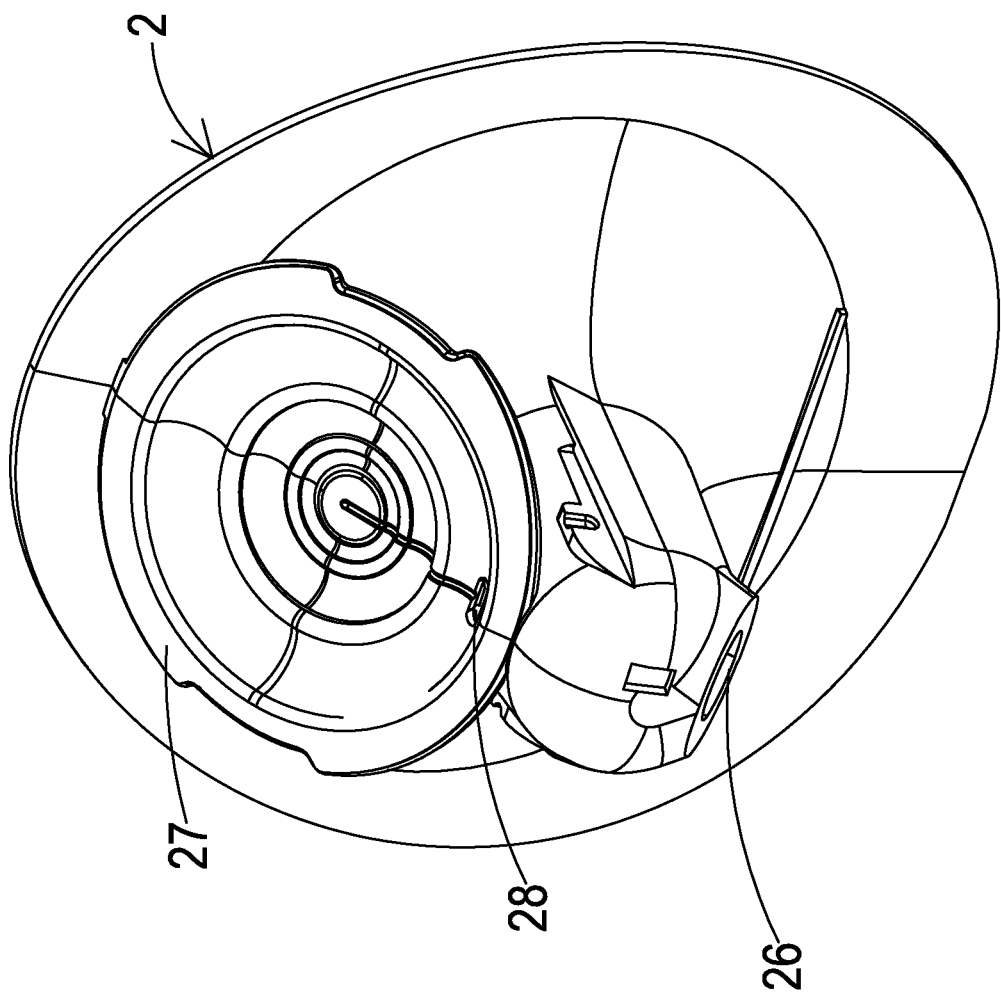
FIG. 4 illustrates a schematic view of a breast milk suctioning shield of the breast pump of the breast milk collecting method of the exemplary embodiment of the present disclosure.

Further, as shown in FIG. 1, the accommodation space 11 includes an opening 12 and a separation film recess 13. The separation film recess 13 is in communication with an air port 14. Moreover, as shown in FIG. 4, a separation film base 27 is assembled on an outer portion of the breast shielding portion 21 of the breast milk suctioning shield 2, and as shown in FIGS. 5 and 6, the separation film base 27 has a negative-pressure port 28 in communication with the nipple passage 22. The flexible separation film 7 is assembled and positioned in the separation film base 27, and the breast milk suctioning shield 2 is assembled in the accommodation space 11 of the main body 1. The separation film base 27 is connected to the separation film recess 13, so that the flexible separation film 7 is completely sealed and positioned between the separation film base 27 and the separation film recess 13. The nipple passage 22 of the breast milk suctioning shield 2 has a breast milk outlet 26 corresponding to the opening 12 of the main body 1. Moreover, the breast milk container 5 is assembled at a bottom portion of the main body 1, and as shown in FIG. 2A and FIG. 2B, a connector component 6 is disposed between the bottom portion of the main body 1 and the breast milk container 5, so that the breast milk container 5 can be assembled on the bottom portion of the main body 1 corresponding to the connector component 6, and the breast milk container 5 is corresponding to the breast milk outlet 26 of the nipple passage 22 to form an outflow passage H (as shown in FIG. 5 and FIG. 6).

As shown in FIG. 5 and FIG. 6, the duckbill valve 4 is disposed at the breast milk outlet 26 of the nipple passage 22. When the breast milk is inside the nipple passage 22, the breast milk flows into the duckbill valve 4 through the breast milk outlet 26, so that the duckbill valve 4 is automatically opened to allow the breast milk to flow into the outflow passage H smoothly to be collected in the breast milk container 5. On the other hand, when no breast milk flows into the duckbill valve 4, the duckbill valve 4 is closed to prevent the breast milk in the breast milk container 5 from flowing back to the breast milk outlet 26 of the nipple passage 22.

Figure 2A:
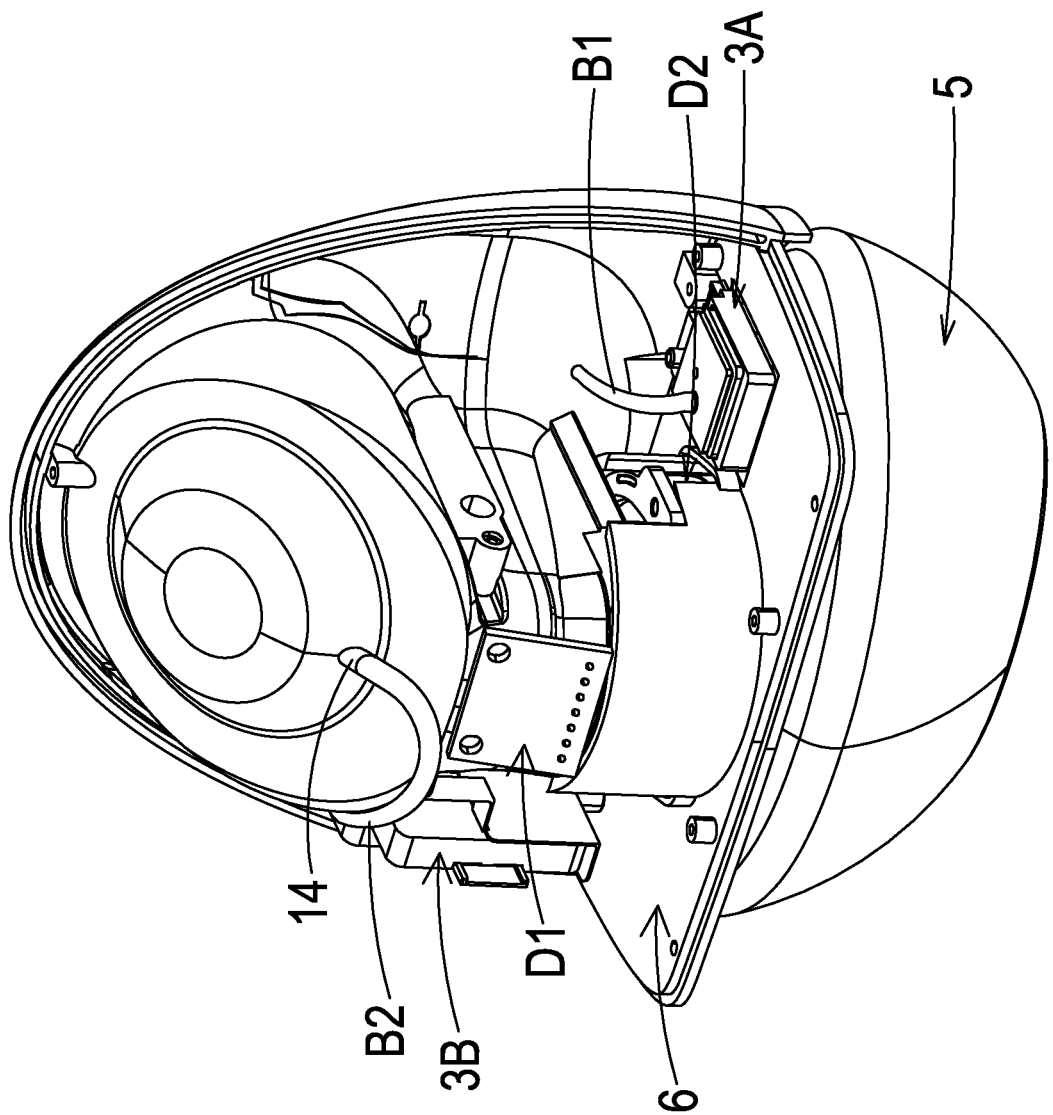
FIG. 2A illustrates a schematic perspective view of a breast pump of a breast milk collecting method by stimulating the mammary gland of a breastfeeder to eject breast milk of a first embodiment of the present disclosure from another view angle.
Figure 2B:
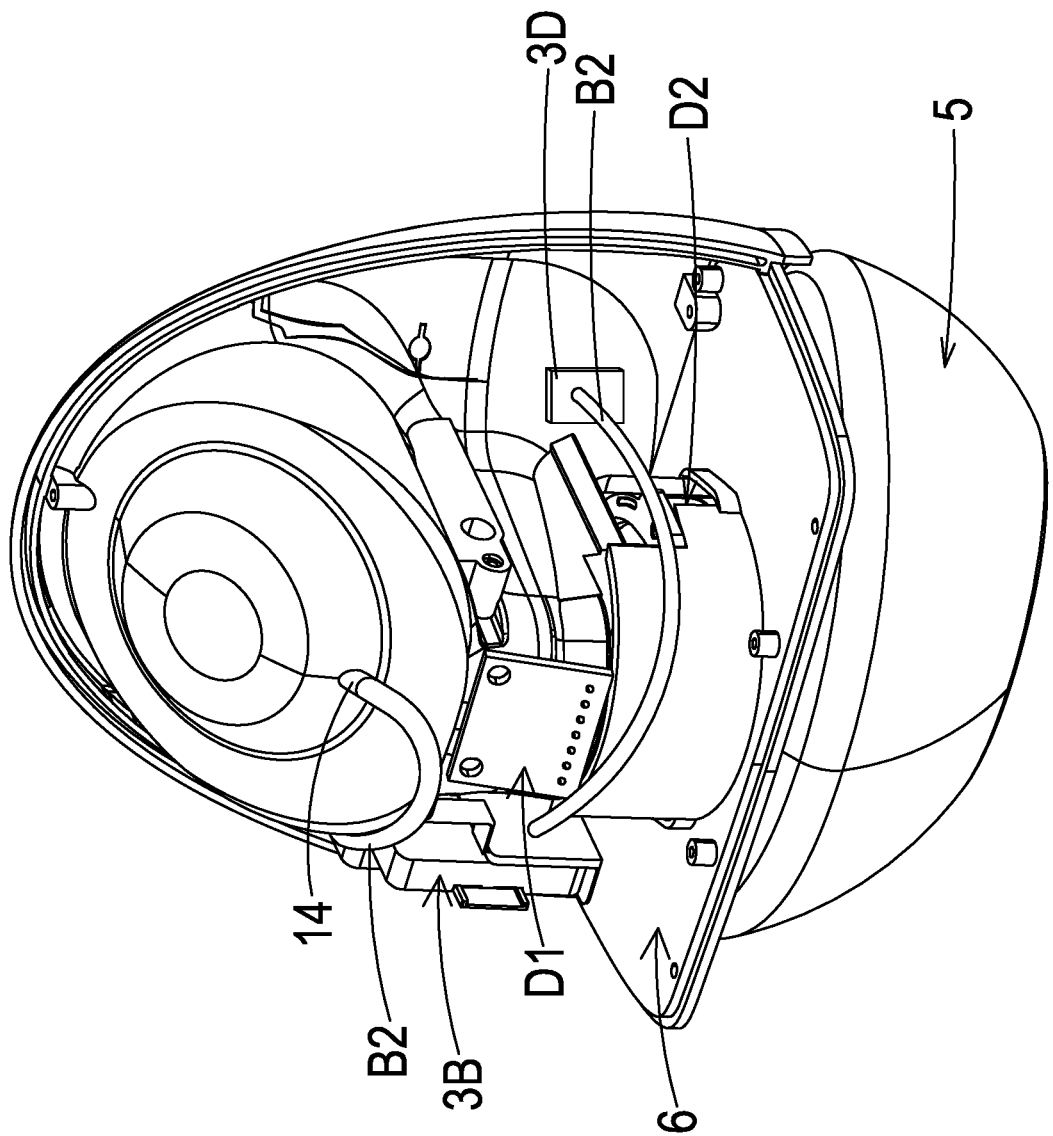
FIG. 2B illustrates a schematic perspective view of a breast pump of the breast milk collecting method by stimulating the mammary gland of a breastfeeder to eject breast milk of a second embodiment of the present disclosure from another view angle.
Figure 3A:
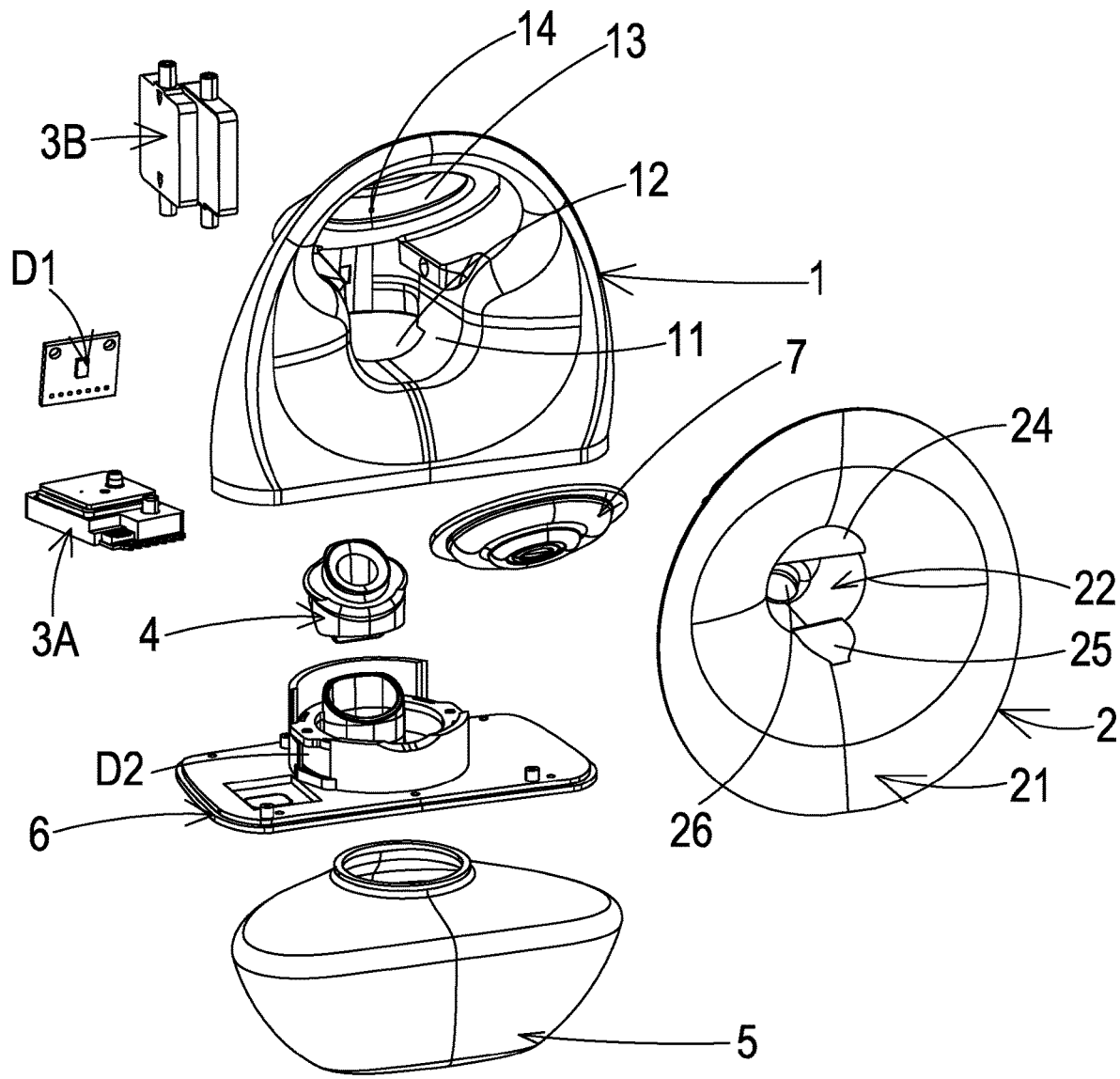
FIG. 3A illustrates an exploded view of components of the breast pump of the breast milk collecting method of the first embodiment of the present disclosure.

In the breast pump of a first embodiment of the present disclosure, as shown in FIG. 2A and FIG. 3A, the air port 14 is connected to a second air pump 3B outside the accommodation space 11 of the main body 1 through a second pipeline B2, and the first air pump 3A is connected to the deformable member 25 through a first pipeline B1. Therefore, according to the breast pump of the first embodiment, a negative-pressure suctioning force is generated to the separation film recess 13 through enabling the second air pump 3B, the flexible separation film 7 between the separation film base 27 and the separation film recess 13 is deformed to generate the negative-pressure suctioning force in the separation film base 27 which results in the negative-pressure suctioning force in the nipple passage 22 through the negative-pressure port 28. Hence, as shown in FIG. 6, when the breast B is placed on the nipple passage 22, the breast B is suctioned by the negative-pressure suctioning force, so as to achieve a breast milk suctioning operation of the breast pump by the suctioning of the negative-pressure suctioning force. In one embodiment, the breast pump includes a plurality of the second air pumps 3B, and the second air pumps 3B are assembled in the second pipeline B2 in a series-connection manner and/or a parallel-connection manner, but not limited thereto. In some embodiments, the second air pump 3B is a piezoelectric pump; alternatively, in one embodiment, the first air pump 3A of the breast pump includes a plurality of the first air pumps 3A, and the first air pumps 3A are assembled in the first pipeline B1 in a series-connection manner and/or a parallel-connection manner, but not limited thereto.

In the first embodiment, the first air pump 3A is enabled to inflate the deformable member 25, and the deformable member 25 is automatically deflated when the first air pump 3A is disabled. Therefore, when the first air pump 3A is enabled, the deformable member 25 is inflated by a gas; when the first air pump 3A is not enabled, the gas in the deformable member 25 flows back to the first air pump 3A through the first pipeline B1, so that the deformable member 25 can be deflated automatically. In one embodiment, the first air pump 3A or the second air pump 3B is a piezoelectric pump; alternatively, in another embodiment, the first air pump 3A or the second air pump 3B is an electric pump that may be a motor, a pneumatic pump, an electromagnetic pump, or other power-driven pumping device, but not limited thereto.

Therefore, as shown in FIG. 5 and FIG. 6, the breast shielding portion 21 of the breast milk suctioning shield 2 is adapted to be placed at the breast B of the breastfeeder, and the nipple of the breast B is placed in the nipple passage 22. Hence, the deformable member 25 is inflated and deflated alternately to press and touch the breast B, and the breast B is further touched, pressed, and held together by the non-deformable supporting member 24 and the deformable member 25. Accordingly, the breast pump can properly mimic the "sucking" or "licking" behaviors of an infant to the breast B, so as to induce the lactation phenomenon to the breastfeeder and stimulate the pituitary gland of the user to secret prolatine or oxytocin and allow the mammary gland of the breast B to produce the breast milk.

Furthermore, as shown in FIG. 5 and FIG. 6, a first detector D1 is disposed at a rear portion of the nipple passage 22 of the breast milk suctioning shield 2, the first detector D1 detects whether the breast B ejects the breast milk and determines whether the breast milk is released from the mammary gland of the breast B. In another embodiment, a second detector D2 is disposed on the periphery of the outflow passage H, and the second detector D2 detects whether the breast B ejects the breast milk and determines whether the breast milk is released from the mammary gland of the breast B.

When the first detector D1 or the second detector D2 detects and determines that the breast milk is not released from the mammary gland of the breast B, the first detector D1 or the second detector D2 enables the first air pump 3A to inflate and deflate the deformable member 25 alternately to press and touch the breast B, and the breast B is further touched, pressed, and held together by the non-deformable supporting member 24 and the deformable member 25. Hence, through applying the non-deformable supporting member 24 and the deformable member 25 to hold and touch the breast B, the breast pump can properly mimic the "licking" and "sucking" behaviors of an infant to the breast B. Consequently, the breast B is stimulated to eject the breast milk.

As mentioned above, in the breast milk collecting method of the first embodiment of the present disclosure, the infant sound is played and/or the infant image or video is displayed, and the breast pump of the first embodiment is placed on a breast of the breastfeeder to collect the breast milk. Moreover, the breast pump includes at least one deformable member to be inflated or deflated alternately to press and touch the breast to mimic a breastfeeding condition to generate the tactile stimulation. Therefore, during the breast milk collecting procedure, the deformable member of the breast pump is provided to be inflated or deflated alternately to press and touch the breast, as well as the audio-playing device is provided to play an infant sound and/or the video-playing device is provided to play the image of the infant of the breastfeeder. Hence, multiple sensory stimulations are provided to stimulate the breastfeeder to increase the secretion of the breast milk by continuously stimulating the pituitary gland of the breastfeeder to secret the prolatine or oxytocin so as to induce the "lactation phenomenon". Therefore, breast milk collection as well as multiple sensory stimulations of the breastfeeder can be achieved by the breast pump of one or some embodiments of the present invention, thus allowing breast milk collecting method provided here to be optimized.

Figure 3B:
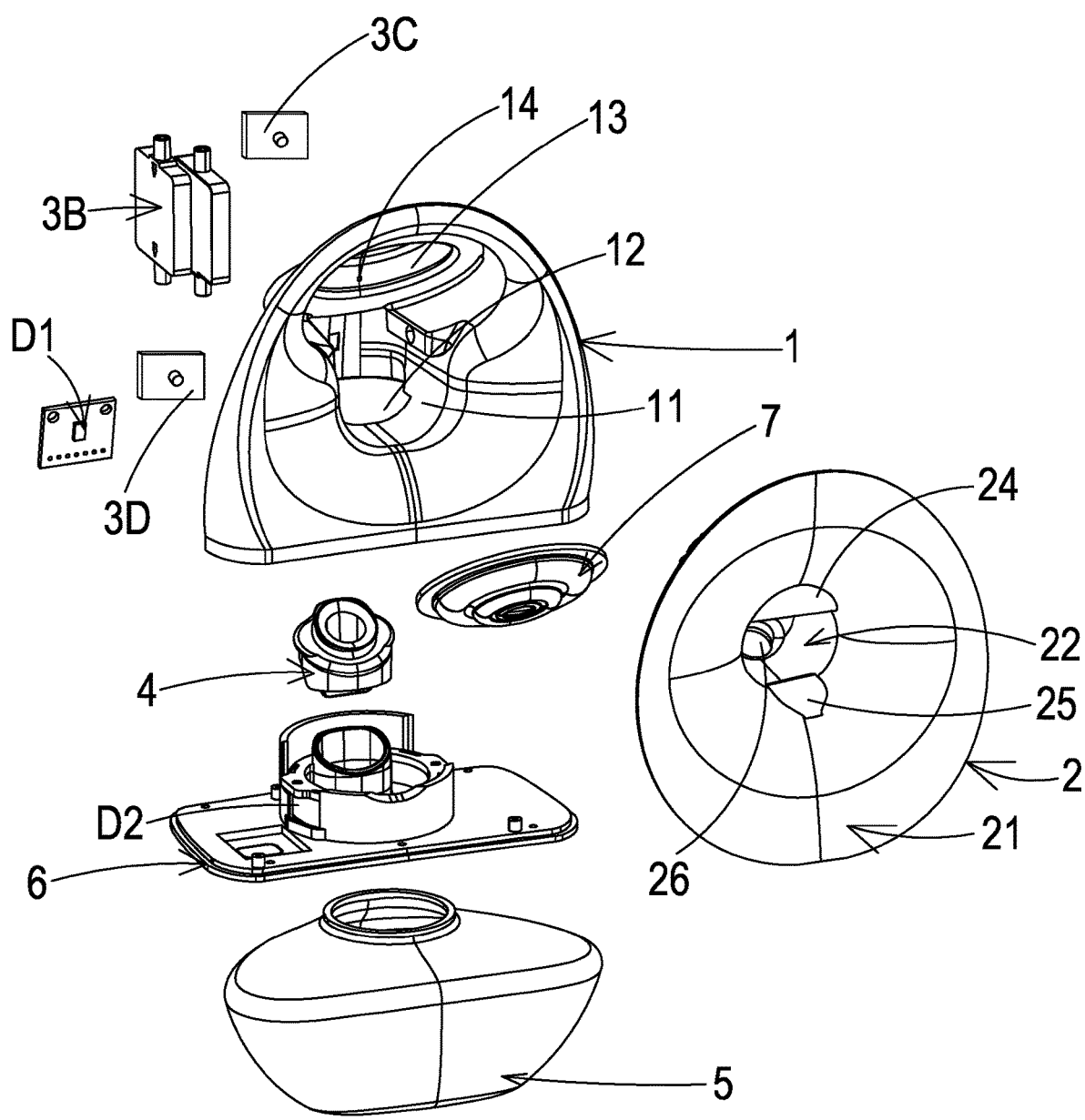
FIG. 3B illustrates an exploded view of components of the breast pump of the breast milk collecting method of the second embodiment of the present disclosure.
Figure 7:
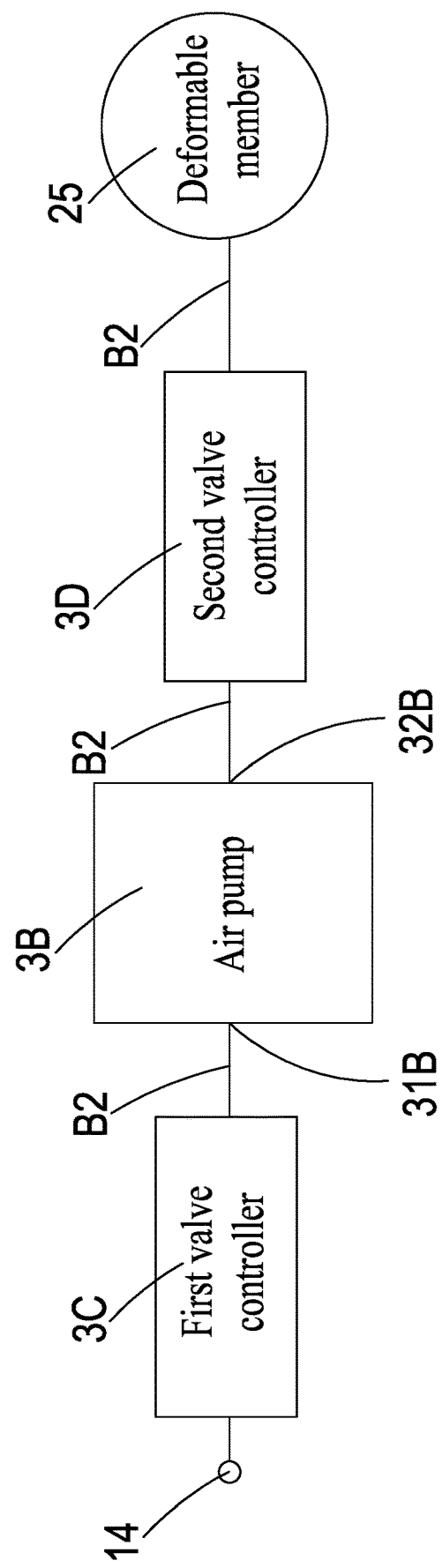
FIG. 7 illustrates a cross-sectional view showing the breast milk suctioning operation of the air pump of the breast pump of the breast milk collecting method of the exemplary embodiment of the present disclosure.

In the breast pump of a second embodiment of the present disclosure, as shown in FIG. 2B, FIG. 3B, and FIG. 7, the second air pump 3B has an intake port 31B and an exhaust port 32B. The intake port 31B is controlled by a first valve controller 3C to suction the nipple passage 22 and create a negative pressure. The exhaust port 32B is controlled by a second valve controller 3D to inflate or deflate the deformable member 25. In this embodiment, the deformable member 25 is controlled by the second air pump 3B to be inflated or deflated, and the first air pump 3A is omitted. Specifically, in this embodiment, a single second air pump 3B is provided to be connected to the first valve controller 3C and the second valve controller 3D, so that the negative-pressure suctioning force of the breast pump as well as the inflation and deflation of the deformable member 25 are controlled by the single second air pump 3B along with the first valve controller 3C and the second valve controller 3D.

As shown in FIG. 4, FIG. 5, and FIG. 7, the air port 14 of the separation film recess 13 is connected to the first valve controller 3C outside the main body 1 through the second pipeline B2, the intake port 31B is connected to the first valve controller 3C through the second pipeline B2, the exhaust port 32B is connected to the second valve controller 3D through the second pipeline B2, and the second valve controller 3D is connected to the deformable member 25 through the second pipeline B2. In one embodiment, the breast pump includes a plurality of the second air pumps 3B, and the second air pumps 3B are assembled in the second pipeline B2 in a series-connection manner or a parallel-connection manner, but not limited thereto. In one embodiment, the second air pump 3B is a piezoelectric pump; alternatively, in another embodiment, the second air pump 3B is an electric pump that may be a motor, a pneumatic pump, an electromagnetic pump, or other power-driven pumping device, but not limited thereto. Moreover, the first valve controller 3C may be an electromagnetic valve and the second valve controller 3D may be an electromagnetic valve, but not limited thereto.

As mentioned above, as shown in FIG. 6 and FIG. 7, the breast shielding portion 21 of the breast milk suctioning shield 2 is adapted to be placed at the breast B of the breastfeeder, and the nipple of the breast B is placed in the nipple passage 22. When the second air pump 3B is enabled, the intake port 31B of the second air pump 3B is controlled by the first valve controller 3C to suction, and a negative-pressure suctioning force is generated and transmitted to the separation film recess 13, so that the flexible separation film 7 between the separation film base 27 and the separation film recess 13 is deformed and generates the negative-pressure suctioning force in the separation film base 27 which results in the negative-pressure suctioning force in the nipple passage 22 through the negative-pressure port 28. Hence, a breast milk suctioning operation of the breast pump can be applied to the breast B by the negative-pressure suctioning force exists in the nipple passage 22 when the nipple is placed in the nipple passage 22. Moreover, when the second air pump 3B is enabled, the exhaust port 32B of the second air pump 3B is controlled by the second valve controller 3D to exhaust a gas or not to exhaust the gas. Hence, the deformable member 25 is inflated by the gas, or the gas does not enter into the deformable member 25 and thus the deformable member 25 is deflated. Therefore, the deformable member 25 is inflated and deflated alternately to touch and press the breast B. Hence, the breast pump can mimic the sucking or touching behaviors of an infant (also including licking and sucking) to the breast B. Alternatively, in one embodiment, the exhaust port 32B of the second air pump 3B is controlled by the second valve controller 3D to exhaust a gas or not to exhaust the gas. Hence, the deformable member 25 is inflated and deflated alternately to press and touch the breast B, and the breast B is further touched, pressed, and held together by the non-deformable supporting member 24 and the deformable member 25. Hence, the breast pump can properly mimic the "sucking" or "licking" behaviors of an infant to the breast B, so as to induce the lactation phenomenon to the user and stimulate the pituitary gland of the user to secret prolatine or oxytocin and allow the mammary gland of the breast B to produce the breast milk.

When the first detector D1 or the second detector D2 detects and determines that the breast milk is not released from the mammary gland of the breast B, the first detector D1 and/or the second detector D2 enables the second air pump 3B to inflate and deflate the deformable member 25 alternately through the second valve controller 3D to press and touch the breast B. Hence, the breast pump can mimic the "licking" and "sucking" behaviors of an infant to the breast B, and the breast B is stimulated to eject the breast milk. In another embodiment, the first detector D1 and/or the second detector D2 enables the second air pump 3B to inflate and deflate the deformable member 25 alternately through the second valve controller 3D to press and touch the breast B, and the breast B is further touched, pressed, and held together by the non-deformable supporting member 24 and the deformable member 25 to properly mimic the "licking" and "sucking" behaviors of an infant to the breast B through holding and touching the breast B by the non-deformable supporting member 24 and the deformable member 25. Consequently, the breast B can be stimulated to eject the breast milk.

As mentioned above, in the breast milk collecting method of the second embodiment of the present disclosure, the infant sound is played and/or the infant image or video is displayed, and the breast pump of the first embodiment is placed on a breast of the breastfeeder to collect the breast milk. Moreover, the breast pump includes at least one deformable member to be inflated or deflated alternately to press and touch the breast to mimic a breastfeeding condition to generate the tactile stimulation. Therefore, during the breast milk collecting procedure, the deformable member of the breast pump is provided to be inflated or deflated alternately to press and touch the breast, as well as the audio-playing device is provided to play an infant sound and/or the video-playing device is provided to play the image of the infant of the breastfeeder. Hence, multiple sensory stimulations are provided to stimulate the breastfeeder to increase the secretion of the breast milk by continuously stimulating the pituitary gland of the breastfeeder to secret the prolatine or oxytocin so as to induce the "lactation phenomenon". Therefore, breast milk collection as well as multiple sensory stimulations of the breastfeeder can be achieved by the breast pump of one or some embodiments of the present invention, thus allowing breast milk collecting method provided here to be optimized.

Based on the above description, one or some embodiments of the present disclosure provide a breast milk collecting method by stimulating the mammary gland of a breastfeeder to eject breast milk, wherein an audio-playing device is provided to generate an auditory stimulation and/or a video-playing device is provided to generate a visual stimulation, and a breast pump is provided to generate a tactile stimulation, so that the pituitary gland of the breastfeeder is stimulated by the multiple sensory stimulations so as to secret prolatine or oxytocin and induce the "lactation phenomenon". Furthermore, the breast milk can be collected by the breast pump, thus allowing breast milk collecting method provided here to be optimized.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A breast milk collecting method by stimulating the mammary gland of a breastfeeder to eject breast milk, wherein the breast milk collecting method comprises:
   providing an audio-playing device to generate an auditory stimulation, so that the pituitary gland of the breastfeeder is stimulated directly by the auditory stimulation to secret prolatine or oxytocin, thereby allowing the mammary gland of the breastfeeder to eject the breast milk; and
   providing a breast pump to generate a tactile stimulation and collect the breast milk, wherein the breast pump is placed on a breast of the breastfeeder and the breast pump comprises:
   a main body having an accommodation space;
   a breast milk suctioning shield assembled in the accommodation space and detachably connected to the main body, wherein a front end of the breast milk suctioning shield has a breast shielding portion, and a nipple passage extends from a rear end of a center portion of the breast shielding portion;
   at least one deformable member is assembled with an annular connection portion located between the breast shielding portion and the nipple passage, and the least one deformable member is controlled by an air pump to be inflated or deflated alternately to touch and press the breast so as to mimic a breastfeeding condition to generate the tactile stimulation, so that the pituitary gland of the breastfeeder is stimulated directly by the tactile stimulation to secret prolatine or oxytocin, thereby allowing the mammary gland of the breastfeeder to eject the breast milk to be collected by the breast pump;
   at least one non-deformable supporting member protruded from an inner surface of the annular connection portion and placed at a location corresponding to the at least one deformable member in the annular connection portion;

a breast milk container assembled at a bottom portion of the main body and corresponding to a breast milk outlet of the nipple passage to form an outflow passage;

a first detector disposed at a rear portion of the nipple passage of the breast milk suctioning shield; and a second detector disposed on a periphery of the outflow passage, the first detector and the second detector detect the presence of the breast milk in the nipple passage and the outflow passage, respectively, so as to determine whether the mammary gland of the breast ejects the breast milk.

2. The breast milk collecting method according to claim 1, wherein the audio-playing device is adapted to record and/or play an infant sound as the auditory stimulation, so that the pituitary gland of the breastfeeder can be directly stimulated by the auditory stimulation to secret prolatine or oxytocin, thereby allowing the mammary gland of the breastfeeder to eject the breast milk.

3. The breast milk collecting method according to claim 1, wherein the air pump is a piezoelectric pump or an electric pump.

4. The breast milk collecting method according to claim 1, wherein the breast pump comprises a plurality of the air pumps, and the air pumps are assembled in a series-connection manner.

5. The breast milk collecting method according to claim 1, wherein the breast pump comprises a plurality of the air pumps, and the air pumps are assembled in a parallel-connection manner.

6. The breast milk collecting method according to claim 1, wherein the at least one deformable member is made of a flexible material.

7. The breast milk collecting method according to claim 1, wherein the at least one deformable member is made of silicone rubber or thermoplastic polyurethane (TPU).

8. The breast milk collecting method according to claim 1, wherein the at least one deformable member is an airbag.

9. A breast milk collecting method by stimulating a mammary gland of a breastfeeder to eject breast milk, wherein the breast milk collecting method comprises:

providing a video-playing device to generate a visual stimulation, so that a pituitary gland of the breastfeeder can be directly stimulated by the visual stimulation to secret prolatine or oxytocin, thereby allowing the mammary gland of the breastfeeder to eject the breast milk; and providing a breast pump to generate a tactile stimulation and collect the breast milk, wherein the breast pump is placed on a breast of the breastfeeder, and the breast pump comprises:

a main body having an accommodation space;

a breast milk suctioning shield assembled in the accommodation space and detachably connected to the main body, wherein a front end of the breast milk suctioning shield has a breast shielding portion, and a nipple passage extends from a rear end of a center portion of the breast shielding portion;

at least one deformable member is assembled with an annular connection portion located between the breast shielding portion and the nipple passage, and the at least one deformable member is controlled by an air pump to be inflated or deflated alternately to touch and press the breast so as to mimic a breastfeeding condition to generate the tactile stimulation, so that the pituitary gland of the breastfeeder is stimulated directly by the tactile stimulation to secret prolatine or oxytocin, thereby allowing the mammary gland of the breastfeeder to eject the breast milk to be collected by the breast pump;

at least one non-deformable supporting member protruded from an inner surface of the annular connection portion and placed at a location corresponding to the at least one deformable member in the annular connection portion;

a breast milk container assembled at a bottom portion of the main body and corresponding to a breast milk outlet of the nipple passage to form an outflow passage;

a first detector disposed at a rear portion of the nipple passage of the breast milk suctioning shield; and a second detector disposed on a periphery of the outflow passage, the first detector and the second detector detect the presence of the breast milk in the nipple passage and the outflow passage, respectively, so as to determine whether the mammary glad of the breast ejects the breast milk.

10. The breast milk collecting method according to claim 9, wherein the video-playing device is adapted to provide an infant image and an infant sound as the visual stimulation, so that the pituitary gland of the breastfeeder can be directly stimulated by the visual stimulation to secret prolatine or oxytocin, thereby allowing the mammary gland of the breastfeeder to eject the breast milk.

11. The breast milk collecting method according to claim 9 wherein the air pump is a piezoelectric pump or an electric pump.

12. The breast milk collecting method according to claim 9, wherein the breast pump comprises a plurality of the air pumps, and the air pumps are assembled in a series-connection manner.

13. The breast milk collecting method according to claim 9 wherein the breast pump comprises a plurality of the air pumps, and the air pumps are assembled in a parallel-connection manner.

14. The breast milk collecting method according to claim 9 wherein the at least one deformable member is made of a flexible material.

15. The breast milk collecting method according to claim 9 wherein the at least one deformable member is made of silicone rubber or thermoplastic polyurethane (TPU).

16. The breast milk collecting method according to claim 9 wherein the at least one deformable member is an airbag.

* * * * *